United States Patent [19]

Kulik

[11] 4,418,044
[45] Nov. 29, 1983

[54] NITRIC OXIDE AND SULFUR OXIDE ABSORPTION BY SCRUBBING WITH $Fe^{++}/S_2O_3^-$

[75] Inventor: Metro D. Kulik, Pittsburgh, Pa.

[73] Assignee: Conoco Inc., Wilmington, Del.

[21] Appl. No.: 339,279

[22] Filed: Jan. 15, 1982

[51] Int. Cl.$^3$ .................... C01B 21/00; C01B 17/00
[52] U.S. Cl. ................................. 423/235; 423/242; 423/243
[58] Field of Search ............... 423/242 A, 242 R, 243, 423/235 R, 235 D

[56] References Cited

U.S. PATENT DOCUMENTS

| | | | |
|---|---|---|---|
| 1,795,120 | 3/1931 | Hansen | 423/222 |
| 2,550,446 | 4/1951 | Blohm et al. | 423/243 |
| 3,906,080 | 9/1975 | Gorin et al. | 423/242 |
| 4,130,628 | 12/1978 | Barnes et al. | 423/235 |

FOREIGN PATENT DOCUMENTS 744312  4/1974  South Africa .

OTHER PUBLICATIONS

Chemical Abstracts, vol. 83, 120341x, (1975).
Chemical Abstracts, vol. 83, 197569k, (1975).

*Primary Examiner*—Gregory A. Heller
*Attorney, Agent, or Firm*—Dale Lovercheck; William A. Mikesell, Jr.

[57] ABSTRACT

A method of scrubbing a gaseous mixture comprising NO and $SO_2$ said method comprising providing a scrubbing solution, said scrubbing solution comprising a solvent and a solute wherein said solute comprises $Fe^{++}$ and $S_2O_3^-$, scrubbing said gas containing nitric oxide with said scrubbing solution.

12 Claims, No Drawings

NITRIC OXIDE AND SULFUR OXIDE ABSORPTION BY SCRUBBING WITH $Fe^{++}/S_2O_3^{-}$

BACKGROUND OF THE INVENTION

The problem of removing $SO_2$ from stack gases has been confronted in the past by varied approaches. Gorin et al in U.S. Pat. No. 3,906,080 discloses an improved $SO_2$ removal method wherein thiosulfate rich aqueous solution containing a sulfite forming additive is used as the selective $SO_2$ absorbent wherein a gas is substantially reduced in $SO_2$ content.

Hansen in U.S. Pat. No. 1,179,120 discloses a process for the simultaneous absorption of ammonia and hydrogen sulfide from industrial gases. Hansen uses a process having two stages, the first stage of which is an ammonium sulfite bisulfite wash having a lower ratio figure of sulfur dioxide to ammonia than about 1.5 and a second stage of which is an ammonium sulfite bisulfite wash having a higher ratio figure of sulfur dioxide to ammonia than about 1.5.

South African Pat. No. 74/4312 disclosed by Neville relates generally to processes for the selective and simultaneous removal of noxious gases, namely oxides of nitrogen and sulfur, from waste industrial gases. A distinct advantage of the process described is that an residual sulfites present in the solution leaving the scrubber are rapidly oxidized to sulfates. This reaction is strongly catalyzed by the presence of small quantities of NO coordinating salts (e.g. Mn, Cu, Fe).

Barnes et al in U.S. Pat. No. 4,130,628 discloses a method for scrubbing $SO_2$ and $NO_x$ containing gases with iron sulfide.

SUMMARY OF THE INVENTION

A method of scrubbing a gaseous mixture comprising NO and $SO_2$ said method comprising providing a scrubbing solution, said scrubbing solution comprising a solvent and a solute wherein said solute comprises $Fe^{++}$ and $S_2O_3^{--}$, scrubbing said gas containing nitric oxide with said scrubbing solution.

A gaseous mixture containing NO is scrubbed in accordance with the present invention by contacting the gaseous mixture containing $NO_x$ with a scrubbing solution. In a preferred embodiment of the invention, the scrubbing solution comprises ferrous ion ($Fe^{++}$) and $S_2O_3^{--}$. In a most preferred embodiment of the invention, the scrubbing solution comprises an alcohol or an ether of an alcohol.

Throughout this specification and claims $NO_x$ includes NO.

Throughout this specification and claims alcohol refers to a broad class of alcohol hydroxyl containing organic compounds including monohydric alcohols such as methanol, alicyclic alcohols such as cyclohexanol, aromatic alcohol such a phenol, dihydric alcohols such as glycols and preferably ethyleneglycol, trihydric alcohols such as glycerol, polyhydric alcohols, and ethers of alcohols such as diethyleneglycol and triethyleneglycol.

It is an object of the invention to provide a method of improved NO removal from stack gas. This object is beneficially accomplished by providing $Fe^{++}$ and $S_2O_3^{--}$ in a nonaqueous scrubbing solution.

DETAILED DESCRIPTION OF THE INVENTION

Employing a scrubber, a stack gas, $SO_2$-free, containing 660 ppm NO and 5 ppm $NO_2$ is contacted at 75° F., a residence time of 12 seconds, a circulation rate of 8 gallons/1000 cubic feet and various concentrations of $K_2S_2O_3$ in aqueous solution. Less than 20 percent of the feed NO is absorbed. Similarly, contacting the gas with concentrated $FeSO_4$ solution gives poor results. However, when the gas is scrubbed with a solution prepared by adding 35 gm of $FeSO_4\cdot7H_2O$ to 200 ml of 45 weight percent aqueous $K_2S_2O_3$, the $NO_x$ absorption increased to 92 percent. By continuously circulating the solution through the scrubber, $NO_x$ absorption efficiency gradually decreases to 71 percent after passage of 340 mol of gas over a period of 30 hours. Although the scrubber solution color becomes reddish black, it remains clear. Increasing the scrubber temperature to 150° F. has no significant effect on NO absorption.

NO absorption occurs via the formation of a complex. Tetrathionate is present in an amount nearly equivalent to that expected by the equation $$4NO + 4K_2S_2O_3 + 2FeSO_4 \rightarrow 2K[Fe(NO)_2\cdot S_2O_3] + 2K_2SO_4 + K_2S_4O_6 \quad \text{I.}$$

A gradual decrease in NO absorption efficiency in the process of equation I occurs and can be attributed to the lowered concentration of $K_2S_2O_3$-$FeSO_4$ absorption reagent. The reaction rate of NO absorption is dependent on the $K_2S_2O_3$-$FeSO_4$ concentration and increased with increasing concentration. For example, at the above given scrubber conditions, employing a $S_2O_3^{--}/FeSO_4$ mol ratio of 5.0, the NO absorption decreases from 92 percent at an $S_2O_3^{--}$ ion concentration of 3.32 mol/liter and to 70 percent NO absorption at 1.3 mol/liter of $S_2O_3^{--}$.

Upon addition of sulfuric acid to the fouled liquor and heating to boil, NO is evolved, the solution becomes colorless and elemental sulfur precipitates. The offgas composition is 75 to 80 percent NO, and the remainder is mainly nitrogen. The composition may be expressed by the equation $$2K[Fe(NO)_2\cdot S_2O_3] + 2H_2SO_4 \rightarrow K_2SO_4 + 2FeSO_4 + 4NO + 2H_2O + 3S^0. \quad \text{II.}$$

Thus, it is seen that dilute NO can be absorbed from stack gas and recovered in concentration form.

It has been discovered that in reaction of equation (I) when $FeCl_2$ is substituted for $FeSO_4$ it is as effective as $FeSO_4$. However, $MnSO_4$ and $CaSO_4$ are inferior as substitutes for $FeSO_4$ in the reaction of equation I. Also, $(NH_4)_2S_2O_3$ may be used in the reaction of equation I in place of $K_2S_2O_3$. When $(NH_4)_2S_2O_3$ is used in place of $K_2S_2O_3$ in the equation I reaction, the scrubbing pH is 4.5 to 5.5 and $NH_3$ vapor is negligible. Thus the improved and beneficial removal of NO is due to the presence of $Fe^{++}$ and $S_2O_3^{--}$.

NO Absorption By Alcoholic $Fe^{++} + S_2O_2^{--}$ Ions, Stack Gas Feed $SO_2$-Free The addition of methanol or high boiling glycols to the ferrous thiosulfate scrubbing solution just described dramatically improves the NO absorption efficiency. One volume of alcohol added to an equal volume of aqueous concentrated salt solution increases the NO absorption from 92 to 99 percent. The reaction velocity is about 0.32 sec$^{-1}$ with respect to NO concentration. In the absence of alcohol the reaction rate is slower by a factor of about ½ and is not strictly first order as is the case in the presence of alcohol with respect to NO concentration. Without limiting the scope of the invention to the following theory of action it is believed that the alcohol by providing an anhydrous environment improves the stability of the NO complex. Accordingly, it is within the scope of the invention to use other non-aqueous liquids in place of alcohol in combination with a ferrous thiosulfate scrubbing solution.

Simultaneous Removal of $SO_2$ and NO

In the present invention both NO and $SO_2$ are removed from stack gas by scrubbing with concentrated $Fe^{++} + S_2O_3^{--}$ ion aqueous or alcoholic solution. The pH is maintained at 5.5 to 6 by injection of alkaline aqueous sulfide [$K_2S$ or $(NH_4)_2S$] to the scrubber loop for efficient $SO_2$ removal. The $SO_2$ absorption occurs by the following reactions $$6(NH_4)_2OH + 3CO_2 \rightarrow 3(NH_4)_2CO_3 + 3H_2O \qquad \text{III.}$$

$$4SO_2 + 3(NH_4)_2CO_3 + 4H_2O \rightarrow 2(NH_4)_2SO_3 + 2NH_4HSO_3 + 3H_2CO_3 \qquad \text{IV.}$$

$$3H_2CO_3 \rightarrow 3H_2O + 3CO_2 \qquad \text{V.}$$

$$2(NH_4)_2SO_3 + 2NH_4HSO_3 + 2NH_4SH \rightarrow 3(NH_4)_2S_2O_3 + 2NH_4OH + H_2O \qquad \text{VI.}$$

The reactions of III–VI sum to the following overall reaction $$4SO_2 + 4NH_4OH + 2NH_4SH \rightarrow 3(NH_4)_2S_2O_3 + 3H_2O \qquad \text{VII.}$$

The NO absorption occurs via reaction I and the tetrathionate formed is converted to thiosulfate in the loop the reactions which are expressed as follows $$(NH_4)_2S_4O_6 + (NH_4)_2S \rightarrow 2(NH_4)_2S_2O_3 + S^o \qquad \text{VIII.}$$

and $$(NH_4)_2SO_3 + S^o \rightarrow (NH_4)_2S_2O_3 \qquad \text{IX.}$$

Thus, by feeding sulfide to the scrubber loop, a partial regeneration of the thiosulfate consumed by reaction I is achieved. This thiosulfate plus that generated by reaction VII serves to sustain a high thiosulfate concentration in the system and consequently results in high NO absorption efficiency when the $Fe^{++}$ ion consumed by reaction I is made up.

EXAMPLE 1

Stack gas containing 795 ppm NO is scrubbed initially with a concentrated aqueous solution of ferrous sulfate—ammonium thiosulfate ($FeSO_4/(NH_4)_2S_2O_3$). The NO concentration in the exit gas is decreased to 85 ppm and remains nearly constant for the first two hours and 10 minutes of operation. At this point 20 mol of methanol is added to the 200 mol of solution in the scrubber reservoir and it is seen that NO breakthrough concentration rapidly decreases to about 43 ppm. Subsequent addition of 20 mol portion of methanol decreased the NO to 17 ppm.

The results of Example 1 showed that the addition of the alcohol increased the NO removal from 89.3 percent to 97.9 percent.

EXAMPLE 2

Stack gas containing 715 ppm of NO is scrubbed at 75° F. initially with a concentrated aqueous solution of ferrous sulfate-ammonium thiosulfate. About 91 percent of the NO is removed in the exit gas in the absence of glycol at a residence time of 16 seconds. Nearly all of the NO is removed from the exit gas when glycol is present. The glycol scrubbing solution is 30 percent by weight $(NH_4)_2S_2O_3$ in 70 percent by weight aqueous glycol. The nonglycol solution is 30 percent by weight $(NH_4)_2S_2O_3$ in water. In both solutions the $S_2O_3^{--}/Fe^{++}$ mol ratio is 8.5.

The apparatus used in carrying out Examples 1 and 2 may be a scrubber comprising a pyrex glass tube having an I.D. of 1.5 inches and being 30 inches in length which is packed with ½" ceramic Berl saddles. The scrubber void vase is 932 ml. A pump is provided for circulating the liquids to the top of the glass tube.

While the invention has been described above with respect to certain of its preferred embodiments it is respectfully pointed out that many variations and modifications are possible within the scope of the present invention and it is anticipated that many such variations and modifications may appear obvious or desirable to those skilled in the art based upon a review of the foregoing description of preferred embodiments.

Having thus described the invention, I claim:

1. A method of scrubbing a gaseous mixture comprising NO and $SO_2$ said method comprising
   providing a scrubbing solution, said scrubbing solution comprising ions of either an alkali metal or ammonium and $Fe^{++}$ and $S_2O_3^{--}$ in a $S_2O_3^{--}/Fe^{++}$ mol ratio of about 5.0 at a $S_2O_3^{--}$ ion concentration of at least 1.3 mols per liter of $S_2O_3^{--}$ in a liquid mixture consisting essentially of alcohol and water scrubbing said gas comprising nitric oxide and $SO_2$ with said scrubbing solution.

2. The method of claim 1 wherein said alcohol is ethylene glycol.

3. The method of claim 1 wherein said alcohol is diethylene glycol.

4. The method of claim 1 wherein said alcohol is triethylene glycol.

5. The method of claim 1 wherein said alcohol is methanol.

6. The method of claim 1 wherein said $S_2O_3^{--}$ ion concentration is at least 3.32 mols per liter.

7. A method of scrubbing a gas containing NO comprising providing a scrubbing solution, said scrubbing solution comprising ions of either an alkali metal or ammonium and $Fe^{++}$ and $S_2O_3^{--}$ in a $S_2O_3^{--}/Fe^{++}$ mol ratio of about 5.0 at a $S_2O_3^{--}$ ion concentration of at least 1.3 mols per liter of $S_2O_3^{--}$ in a liquid mixture consisting essentially of alcohol and water,
   scrubbing said gas containing NO with said scrubbing solution.

8. The method of claim 7 wherein said alcohol is ethylene glycol.

9. The method of claim 7 wherein said alcohol is diethylene glycol.

10. The method of claim 7 wherein said alcohol is triethylene glycol.

11. The method of claim 7 wherein said alcohol is methanol.

12. The method of claim 7 wherein said $S_2O_3^{--}$ ion concentration is at least 3.32 mols per liter.

* * * * *